United States Patent
Lyall, III (10) Patent No.: US 7,225,728 B2
(45) Date of Patent: Jun. 5, 2007

(54) BREWING APPARATUS WITH PRE-INFUSION AND PULSE BREWING

(75) Inventor: Lucian H. Lyall, III, Saratoga, CA (US)

(73) Assignee: Wilbur Curtis Company, Inc., Montebello, CA (US)

( * ) Notice: Subject to any disclaimer, the term of this patent is extended or adjusted under 35 U.S.C. 154(b) by 342 days.

(21) Appl. No.: 10/769,246

(22) Filed: Jan. 30, 2004

(65) Prior Publication Data

US 2005/0166765 A1 Aug. 4, 2005

(51) Int. Cl.
*A47J 31/00* (2006.01)
(52) U.S. Cl. .......................... 99/299; 99/283; 426/433
(58) Field of Classification Search .................. 99/299, 99/305, 280, 282, 283; 426/433, 434, 435
See application file for complete search history.

(56) References Cited

U.S. PATENT DOCUMENTS

| 5,186,096 A | * | 2/1993 | Willi | 99/282 |
| 5,303,639 A | * | 4/1994 | Bunn et al. | 99/289 R |
| 5,375,508 A | | 12/1994 | Knepler | |
| 6,148,717 A | | 11/2000 | Lassota | |
| 6,843,164 B2 | * | 1/2005 | Drobeck | 99/280 |
| 2003/0126993 A1 | * | 7/2003 | Lassota et al. | 99/279 |

* cited by examiner

*Primary Examiner*—Reginald L. Alexander
(74) *Attorney, Agent, or Firm*—Fulwider Patton LLP (57) ABSTRACT

A brewing apparatus includes an intermittent brewing feature whereby a controller regulates flow into a brew basket based upon a user selected pre-stored flow profile comprising a sequence of flow pulses. A user selects from among a plurality of stored intermittent flow profiles according to the specific brewing operation, where each profile is designed for different brewing conditions. The flow profiles can be incorporated into a larger set of pre-stored or programmed instructions that also regulate temperature, volume, warming operations, and the like.

5 Claims, 6 Drawing Sheets

BREWING APPARATUS WITH PRE-INFUSION AND PULSE BREWING

BACKGROUND OF THE INVENTION

1. Field of the Invention

The present invention relates generally to a beverage brewing apparatus, and more particularly to a programmable brewing apparatus with "pulse" brewing and pre-infusion brewing capabilities.

2. Description of Related Art

The art of coffee brewing has advanced significantly over the last few decades from the old fashioned percolators to today's state of the art automatic brewing machines. But the goal of coffee machines has remained the same—draw the appropriate amount of flavored solutes and oils from the ground coffee beans without extracting the bitter residues and complex compounds that are released when the coffee is overbrewed. Releasing the appropriate flavor from coffee is a process that optimally considers the type of coffee, the temperature of the infusing water, the exposure time of the grounds to the infusing liquid, the level of wetting achieved by the infusing water, and so forth. A brewing apparatus that accounts for the variations and factors that affect the brewing of an optimal cup of coffee has a higher probability of success than those machines that do not account for such factors.

One factor that is critical to successful extraction of the coffee solutes is the level of wetting that the coffee brewing apparatus achieves in connection with the infusion of hot water through and about the coffee grounds. Coffee grounds are naturally coated with a fine layer of oil that is hydrophobic, that is, the coating insulates the grounds against wetting by repelling or resisting the infusing water. When water is delivered to a batch of coffee grounds, the water will create paths through the grounds that resists wetting of all grounds at the expense of overexposure of some grounds to the infusion liquid. This phenomenon results in inconsistent brewing batches because even if the grounds for each batch is measured accurately, the lack of consistent wetting results in some batches being over wetted while other batches are under wetted. This is an unsatisfactory condition that requires addressing. This layer also causes the individual grounds to float on pools of collecting water, which inhibits the full extraction of the grounds' flavor. It is important to prevent or limit the degree of floatation that the grounds experience during the brewing operation.

It has been discovered that infusing water intermittently into the brewing chamber ("pulse brewing") increases the wetting of the grounds and promotes more uniform brewing. By introducing pulses of water into the grounds, turbulence is created that jostles and moves the coffee grounds within the brewing chamber. As the grounds move and the water mixes with the grounds, the thin oily coating on the grounds dissipates and erodes leaving the unprotected granules exposed to the hot water. In between pulses, the grounds are exposed to gradual draining of the water and semi-drying as the water pulses flow through the brewing chamber. Each successive pulse aids in achieving a more complete wetting of the grounds as the grounds are agitated by the flowing water, resulting in a much more consistent brewing operation.

U.S. Pat. No. 6,148,717 to Lassota describes a beverage maker with intermittent beverage liquid dispenser and apparatus and method for uniform contact of brew ingredient with brew. Lassota discloses a beverage brewer where a programmable dispenser controller intermittently passes liquid to a dispenser head during pre-selected duty portions of a plurality of control periods in order to control the quantity of liquid dispensed and the duration of the dispense period. The controller includes a microprocessor for controlling the dispensing valve pursuant to a computer program to automatically adjust the duty portions to maintain a pre-selected dispense period during different total dispense quantities and to maintain a pre-selected total dispense quantity for different selected dispense time periods. The control periods are generated by a dividing means that divides the total dispensing period into a plurality of uniform control periods. The control periods are then divided into duty portions and non-duty portions that create the pulse brewing feature. The creation of uniform control periods by dividing the overall brewing period limits the period of the cycles to integer multiples of the overall brewing period.

U.S. Pat. No. 5,375,508 to Knepler includes a control module that allowed the entry of control limits that regulated flow from a heated water source to an infusion assembly, establishing a dispensing cycle that periodically dispensed water from the heated source to the infusion assembly. The pulses of water provided to the infusion assembly are entered by the user and stored in the controller's memory. For example, the user can cause the valve to open at T0 and close at T0 plus sixty seconds, and then open again at T0 plus seventy seconds and close at T0 plus one hundred thirty seconds. The references of Knepler and Lassota are incorporated in full herein by reference.

Another method of maximizing the wetting of the coffee grounds is by pre-infusion or pre-wetting of the coffee prior to brewing. By introducing an initial spray of heated water on the grounds and allowing a short soaking period, the grounds are more efficiently wetted during the brewing cycle. It is preferable to perform either pulse-brewing or pre-infusion prior to the brewing cycle, but not both.

The selection of the appropriate periods of pulse brewing or pre-infusion is dependent upon various factors and the typical consumer is not familiar with the conditions that would favor one pulse brewing sequence over another or the choice between pulse brewing and pre-infusion. The prior art lacks a brewing apparatus that incorporates several predetermined brewing profiles for various conditions that allow the user to simply select a profile and the brewing apparatus will apply the pulse brew profile or pre-infusion sequence based on information stored in its memory. Alternatively, the brewing apparatus can store global instructions that include pulse brew or pre-infusion options, and further include other brewing options and parameters that works best for the present conditions.

SUMMARY OF THE INVENTION

The present invention is directed to a brewing apparatus that maintains a plurality of intermittent brewing profiles based on coffee types and conditions and allows a user to select from among the pre-stored profiles the appropriate pulse pattern or pre-infusion program at the initiation of each brewing operation. The use of a pre-stored intermittent brewing profile can be incorporated into a larger stored brewing sequence or recipe that accounts for other extraction factors such as temperatures, brewing quantities, coffee types, and the like. The brewing apparatus may have as many as ten or more pre-stored recipes from which a user can select at the initiation of a brewing operation based upon the present brewing conditions. The use of such pre-stored recipes that account for both pre-infusion and pulse brewing as well as other brewing factors is believed to be novel and not taught or suggested by the prior art.

DETAILED DESCRIPTION OF THE PREFERRED EMBODIMENTS

Figure 1:
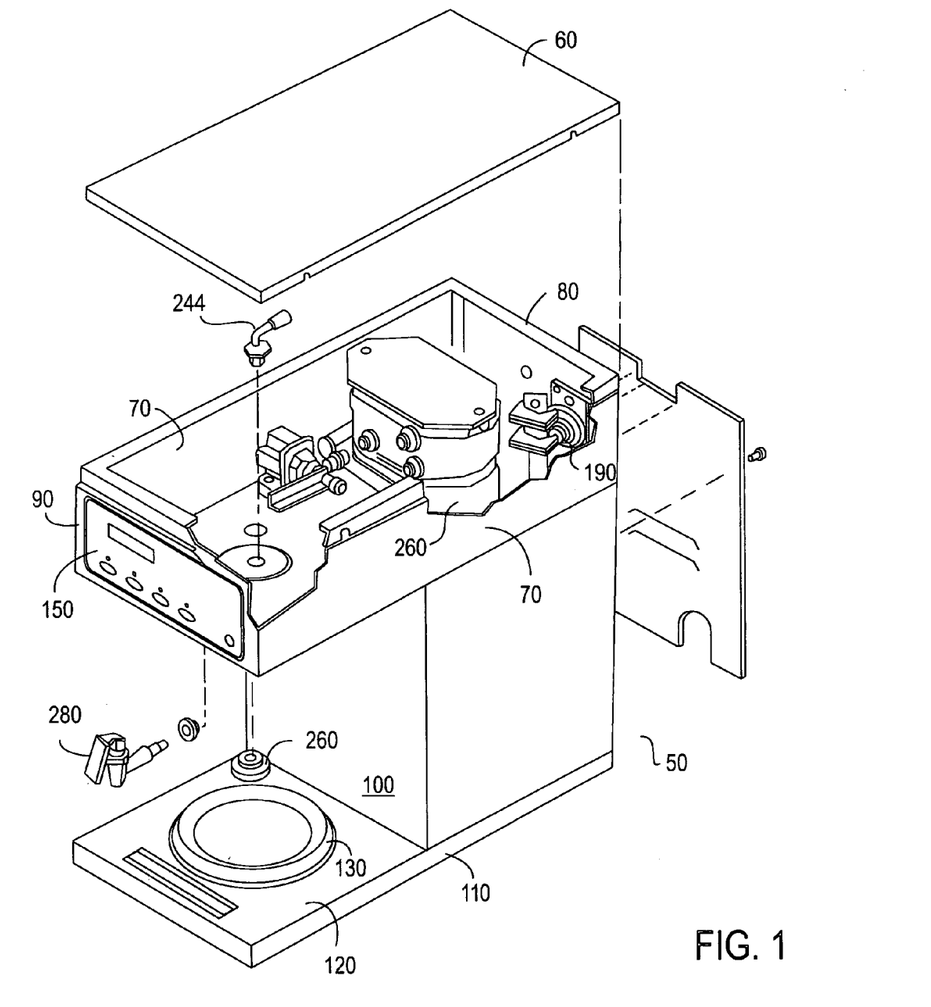
FIG. 1 is an elevated, perspective exploded view of a preferred embodiment of the present invention.
Figure 2:
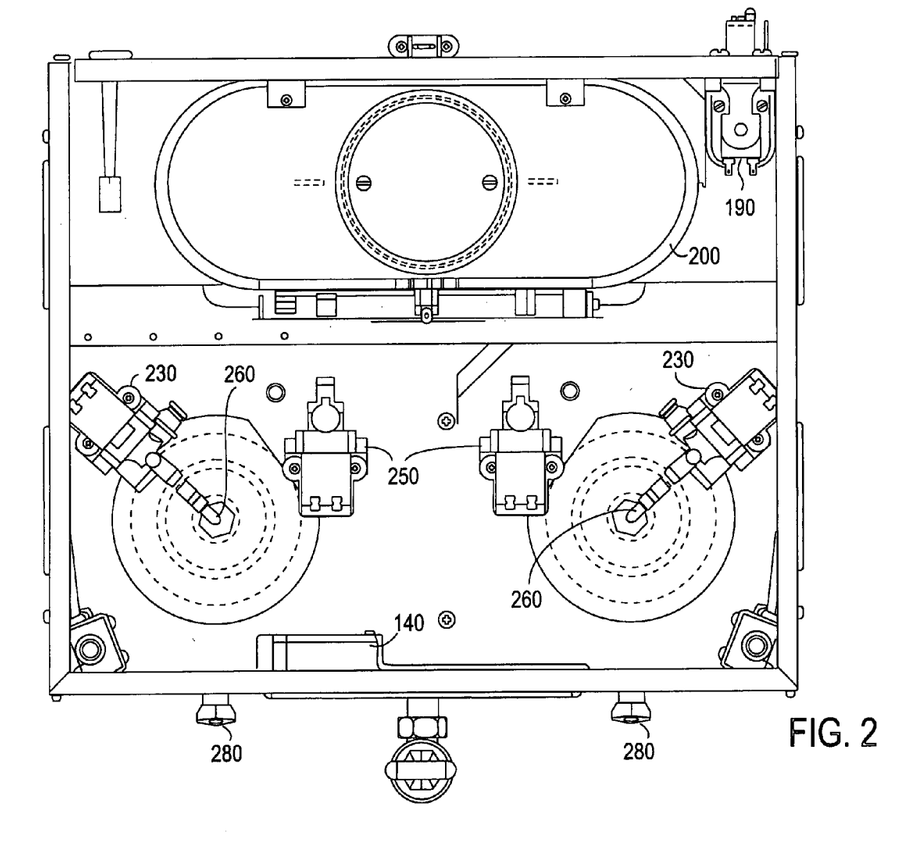
FIG. 2 is a top view of a second embodiment of the present invention with the cover removed.

The brewing apparatus embodying the present invention is generally shown in FIG. 1. A housing 50 having an upper panel 60, left and right side panels 70, a rear panel 80, an upper front panel 90, and a lower front panel 100 forms a structure for enclosing the operational components of the brewing apparatus. Projecting forwardly from the base 110 of the housing 50 is a warming plate structure 120 including a platform supporting an annular heating ring 130. The heating ring 130 encloses a semi-circular heating element (not shown) connected through a controller to a supply of electrical current. The heating element comprises an electrically resistive coil that generates heat as electrical current flows through it when actuated by the controller to heat a decanter of brewed beverage. The decanter warming function is regulated by the controller 140 connected to the control panel 150 that directs electrical current through the resistive heating element periodically as required to maintain the temperature of the decanter at a preselected value. The heat from the heating element is conducted to the annular heating ring 130, which in turn warms the decanter of coffee (not shown) resting thereon.

The upper front panel 90 of the housing 50 is equipped with a control panel 150 (see FIG. 3) including an LED display 160 for displaying messages and programming options, and a series of depressible push buttons 170 for entering commands and selecting options. The control panel 150 preferably includes an on/off button 180, and further includes a left arrow button 170a, an enter button 170b, a right arrow button 170c, and a "start" or "brew" button 170d. Above each button is a small LED 172 that illuminates when the buttons are actuated. A light 175 may also be provided that illuminates when the brewing apparatus is operating or connected to a power supply. In a first embodiment, the on/off button 180 is depressed resulting a message displayed in the LED display pane 160 requesting selection of various options discussed more fully below. The user depresses the enter button 170b to select the current option, or depresses the left or right arrow buttons 170a,c to scroll through messages or options until the desired option is reached.

Figure 3:
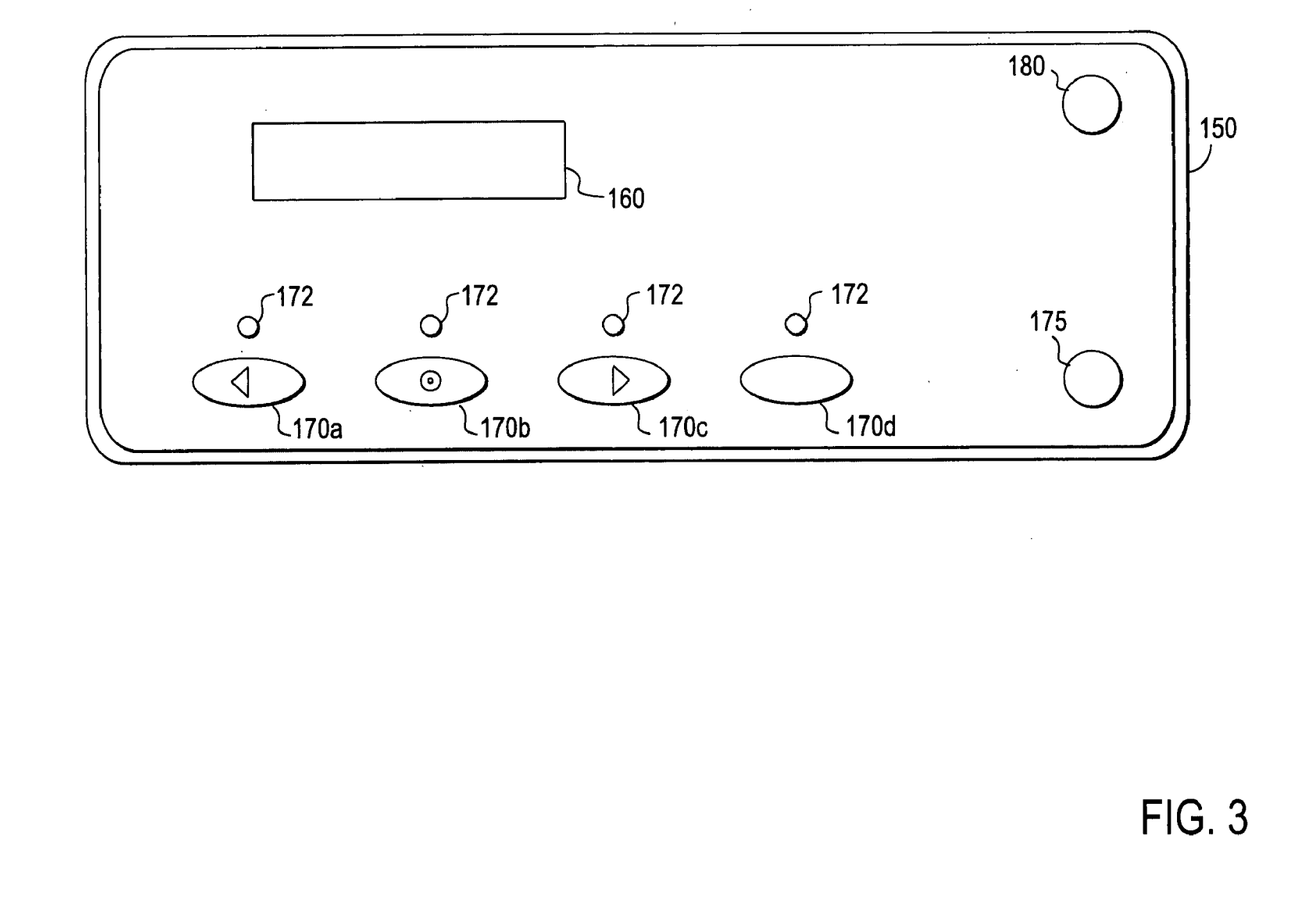
FIG. 3 is a front view of the control panel of the embodiment of FIG. 1.

Behind the control panel 150 is a control board with pressure sensitive switches strategically located behind the push buttons 170 on the control panel. Depressing the buttons 170 on the control panel 150 actuate the pressure sensitive switches on the control board to generate electrical signals. When the on/off button 180 is depressed by a user, the control board behind the control panel 150 sends a command to a fluid level sensor 210 in a water tank 200 to determine if the requisite level of water resides in the tank. If the water level sensor 210 determines that the water level is inadequate, the controller 140 sends a command to the valve inlet 190 coupled to a water supply or other infusing liquid to open and fill the heating tank 200. Water from the supply flows under pressure through the valve 190 until the heating tank 200 is filled. The water level sensor 210 located at the upper portion of the heating tank 200 sends a signal to the controller 140 when the water level reaches the sensor 210, which in turn prompts the controller 140 to send another signal to the valve inlet 190 closing the inlet and terminating the filling of the tank.

A temperature sensor 212 on the heating tank 200 determines whether the temperature of the water in the heating tank is at or above a predetermined brewing temperature, and communicates the status of the temperature to the controller 140 via an electrical cable. If the temperature is below the predetermined brewing temperature, the controller 140 actuates a heating element disposed within thermal jacket of the heating tank 200 to raise the temperature of the water in the tank. When the temperature of the water in the heating tank 200 reaches the designated temperature, the temperature sensor 212 sends a signal to the controller 140, which in turn signals the heating element in the thermal jacket to deactivate and the heating operation is discontinued. The temperature sensor continues to monitor the temperature of the water in the tank and resumes the heating operation when the temperature in the heating tank once again drops below its preferred brewing temperature.

Figure 5:
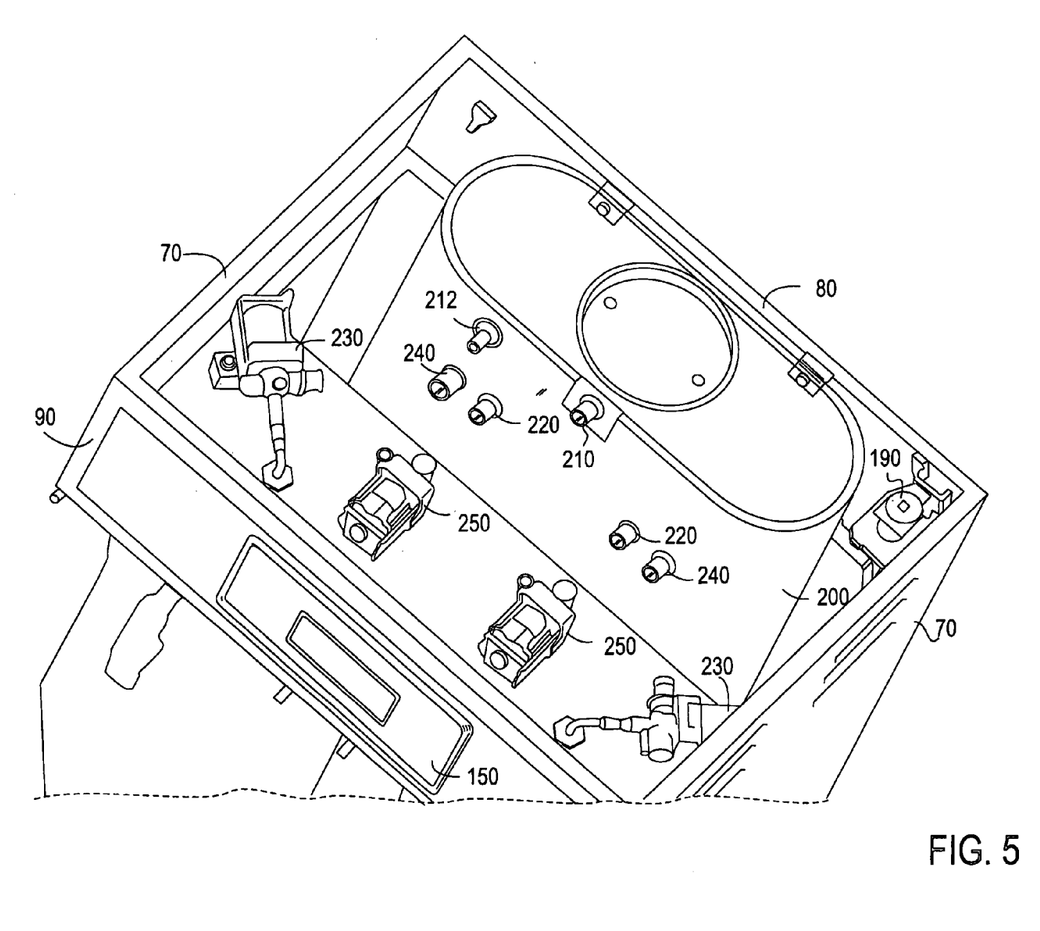
FIG. 5 is an elevated, perspective view of the upper portion of the embodiment of FIG. 2 with the cover removed.

When the brew button 170d is depressed, if water in the heating tank 200 is at the acceptable temperature level then water is directed from the heating tank through ports 220, 240 such as those shown in FIG. 5. Bypass ports 220 are connected by respective tubings (not shown) to bypass valves 250, while brew ports 240 are connected to valves 250 that lead to the spray head nozzle 244 and spray head 260.

Each valve 230,250 is opened and closed by the controller 140 according to programming discussed below. Thus, when the valves 230 are open, the water from the heating tank flows through ports 240 along conduits and through the valves 230 where the water is directed through the nozzle 244 to the spray head 260. The water exits the spray head 260 and is ejected into a brew basket (not shown) positioned below the spray head 260 and above the decanter seated on the warming plate 130. In this manner, hot water floods the brew basket containing a quantity of coffee granules to release the flavors and oils necessary to produce brewed coffee as is known in the art.

The flow of water into the brew basket, and thus the brewing operation, is controlled in the present invention by the opening and closing of the valve upstream of the brew basket. By intermittently opening and closing the valve, the brewing apparatus can introduce a pulsing effect that more thoroughly extracts the solutes and flavorings of the coffee granules without over brewing the coffee which can lead to bitterness. The jostling of the grounds through intermittent "pulse" brewing is achieved first by repeated exposure to the infusion process to gradually increase the extraction for each cycle. That is, water passes through the brew valve 230 and out the spray head 260 at pre-determined intervals as the controller 140 opens and closes the brew valve. The water exiting the spray head 260 enters the brew basket where it wets and extracts flavor from the grounds located therein.

Moreover, the repeated introduction of the fluid causes turbulence and movement of the granules that might otherwise receive less exposure to the infusing water. Thus, the granules are moved about and more evenly exposed to the water compared with a single water introduction period, leading to a more consistent and more efficient extraction process. Alternatively, the pre-infusion option allows the grounds to be exposed to an initial pre-wetting phase prior to the actual brewing operation, where the grounds are soaked and allowed to sit. The time between the pre-infusion and the actual brewing operation gives the grounds time to soak and more thoroughly wet, facilitating flavor extraction during the brewing operation. This pre-infusion has been found to promote more complete wetting and more consistent flavor extraction during the brewing operation.

Bypass valves 250 connected to the heating tank 200 serve two purposes. The first purpose is to make available heated water through dispensing spouts 280 on the front of the apparatus. Heated water can be directed from the heated tank to the spout and used to make tea or to manually dilute a quantity of brewed coffee or other beverage. A second purpose for the bypass valve is to direct water into the decanter of brewed coffee directly without first proceeding through the brew basket, which in effect dilutes the brewed beverage. Thus, when the bypass valves are opened by the controller then heated water may pass out of the heating tank 200 at ports 220 and through conduits (not shown) to the bypass valves 250 and around the brew basket via tubing such that the water can be introduced into the brewed beverage.

A novel feature of the present invention is that during pulse brewing, the controller may be programmed to alternate flow through the bypass valves 250 and the brew valves 230 leading to the spray head 260 in such a manner that the flow into the decanter appears continuous. That is, during the period where the pulse is off in the brewing operation, the bypass valves 250 are open and when the pulse is on in the brewing operation, the bypass valves are closed, leading to the appearance of uninterrupted flow during the entire brewing operation. This effect can be beneficial in that the operation has a more consistent and uniform flow, whereas an interrupted flow may give the appearance that the operation is malfunctioning or that there is clogging or other difficulties. A uniform flow also reduces splashing and noise that occurs when the pulse brewing operation is not offset by the bypass flow. In order to achieve the uniform flow, the controller switches flow alternately between the bypass flow route and the spray head flow route and the two flows are reunited below the brew basket and above the decanter for collecting the brewed beverage.

Figure 4A:
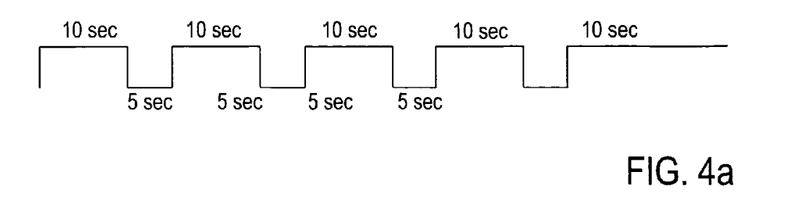
FIG. 4 is a series of exemplary pulse brew sequences employed by a preferred embodiment of the present invention.

In present invention implementation of the intermittent or pulse brewing process can be facilitated by creating and storing a plurality of brew profiles selectable by the user using the buttons on the display panel. For example, referring to FIGS. 4a–4c, a series of intermittent pulse brew profiles are stored in the memory of the controller 150 and available for selection by the user during the brew selection process. FIG. 4a shows a profile or pulse sequence wherein the valve is open for ten seconds followed by a closure of the valve for five seconds. This profile is repeated until the predetermined quantity of water has been introduced into the brewing chamber or a timer determines that the necessary time has elapsed. It should be noted that the time that the valve is open for each cycle is not determined by any division of a predetermined total brewing operation (e.g., 4 minute total brewing time divided by 16 cycles equals 15 second cycles), but rather a cycle is selected and then carried out until the process is halted by the achievement of the predetermined brewing quantity or a brewing time is achieved. In this manner, the duration of the cycle can be selected based on optimum performance characteristics of the particular coffee rather than mechanically determined by the rote division of the brewing period, which may not result in the preferred cycle length.

Figure 4B:
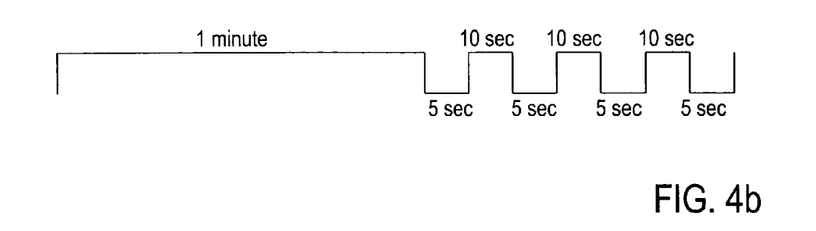
Figure 4C:
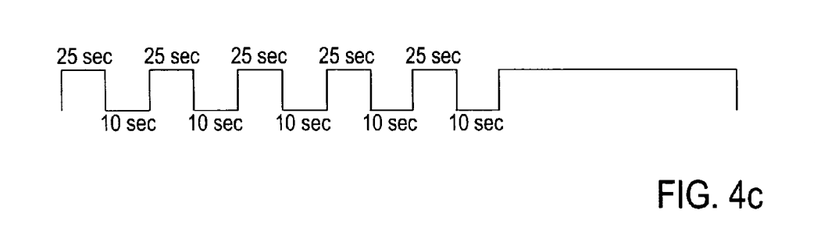

FIG. 4b shows an alternate brewing profile wherein a first portion results in the valve being open for approximately one minute straight, followed by a repeating cycle of closure for five seconds and open for ten seconds continued until such time as the predetermined brewing quantity is achieved. At that point, the valve is closed regardless of the state of the current position in the profile (i.e., the profile may be at the beginning, end, or intermediate portion of the ten second fill cycle when the filling operation is stopped. The controller may include a timer to evaluate a total open time for the valve, and perform a calculation of the total water through the valve (including any bypass flow) based on the timer measurements, the valve orifice size, and the pressure of the water pumped through the orifice. When the controller determines that the pre-selected volume of water has entered the brewing chamber, the valve is closed until the next brewing operation is initiated. In this manner, the intermittent brewing profile selected by the user is implemented without calculating the number of cycles needed to complete the brewing operation and without the need for the user to calculate or enter specific open/close times. The apparatus of the present invention thus avoids the risk of miscalculation or mis-entry of a time value by a user, and avoids the constraint that the period of the intermittent cycle must be an even integer of the total brewing operation time. For example, the profile in FIG. 4c shows a twenty-five second open period and a ten second closed period for a total cycle of thirty five seconds. While a thirty-five second interval does not divide evenly into four or five minute brewing operations, this cycle may be the optimum cycle for particular coffee blends. The present invention allows more flexibility in the available cycle duration by not limiting the cycle duration to integer multiples of the total brewing time. Other profiles are available that achieve an intermittent brewing operation stored as an option in the memory of the controller and selected by identifying an option in the pre-brewing preparations.

Figure 6:
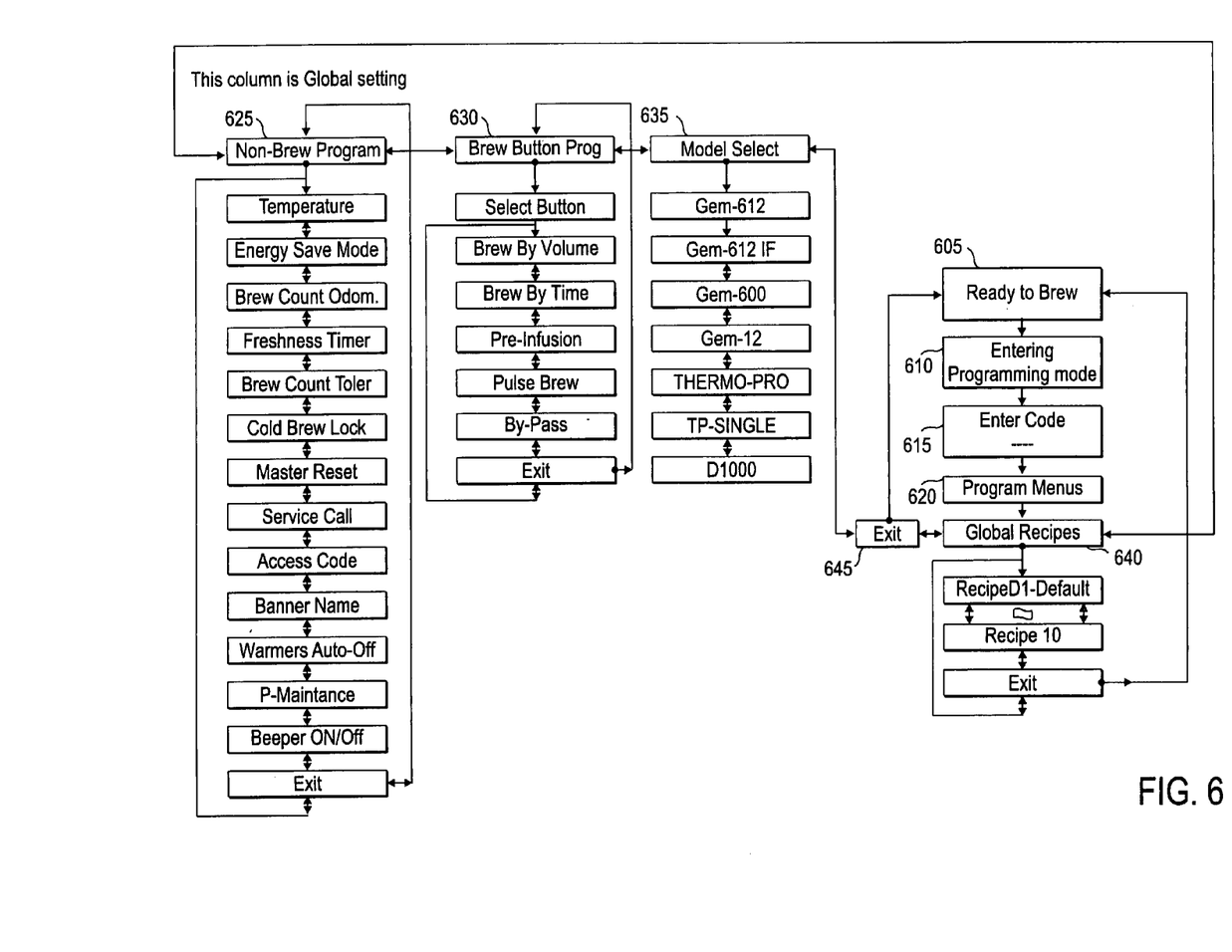
FIG. 6 is a flow chart of a sample menu program of a preferred embodiment of the present invention.

The programming of the brewing apparatus of the present invention may encompass a plurality of various operational parameters affecting the performance control of the brewing operation. FIG. 6 illustrates a flow chart for an exemplary programming operation of a preferred embodiment. The maneuvering of the program is accomplished via the push buttons 170 on the control panel 150 and the controller 140 coupled thereto. Beginning at step 605, the "ready to brew" message is presented in the LED display 160 of the control panel 150 on the brewing apparatus. Depressing the "enter" push button 170b will cause the program to advance to the "entering programming mode" as shown in step 610, and the user will be prompted to enter an authorization code in step 615. Once the authorization code has been entered, the program provides for setting various options listed in program menus as shown in step 620. The menus include global settings (step 625), single brew brewing options (step 630), model identification (step 635) global recipes (step 640) and a program exit (step 645).

The global settings (step 625) include various brewing options such as temperature, energy savings mode, brewing operations odometer, freshness timer, brew counter (total), master reset switch, cold brew lock—an option where brewing will not proceed until the temperature of the heating tank 200 is above a minimum temperature, warming settings, changing the access code, creating a banner in the LED display, sound effects, and the like. These global settings are toggled by the left and right arrow buttons 170a,c and set with the enter button 170b on the control panel. Each setting is stored in the memory of the controller 140 and implemented during each brewing operation unless overridden by a selected "recipe" as discussed below.

The single brew brewing options of step 630 include settings for implementing the brewing operation, including brewing by time or by volume, using pre-infusion or pulse brewing, and whether bypass is to be used. If pre-infusion is selected, the pulse brewing option is eliminated because over-wetting of the grounds (and the resultant bitterness) has been found to occur when these two operations are combined. If pulse brewing is selected, a choice of three or more pre-stored profiles are available such as those shown in FIG. 4. from which the user can select based on various parameters, such as the type of coffee bean, decaffeinated or regular, free grounds or filter packet, type of roast, and a number of other factors that determine the optimum pulse brew profile. The user can refer to a manual for choosing the appropriate profile based on the conditions for the particular brewing operation. Further, use of bypass and the creation of a constant flow delivery using both pulse brew and bypass in coordination can be implemented as part of the global settings discussed above.

The model selection step 635 is available to identify the various brewing apparatus, which may have different volume capabilities, additional or fewer options, and require specific procedures. This selection step allows the manufacturer to write one code for a line of products as opposed to writing code for each model.

Step 640 refers to a recipe selection wherein a recipe is time-saving option that allows the user to repeat a complete set of instructions and selected options found to work best in a particular situation, and the recipe overrides any conflicting global setting. For example, recipe 1 can be a temperature setting particularly chosen for espresso roast coffee, combined with pulse brewing using Program A shown in FIG. 4a, along with bypass flow using a brew by time operation. This recipe allows quick, consistent brewing of a particular type of coffee without reprogramming the entire sequence. Other recipes can be developed for decaffeinated coffee, for a particular user's preference for strong coffee, to account for differences in wetting characteristics when using filter packets rather than free grounds, and the like. The use of recipes that include prestored pulse brewing options are a significant advance over the prior art brewing apparatus.

Selecting a recipe will prompt the user to either edit or implement the stored recipe. If edit is chosen, the program allows each menu to be accessed so that the user can create a complete set of instructions particular to the recipe. Once stored, these instructions are carried out each time the user selects the recipe, and the commands override any conflicting commands stored in the global settings. This saves the user time and provides a more convenient method of programming the brewing apparatus of the present invention.

The operation of the brewing apparatus of the present invention may be carried out in the following manner. The unit is first connected to a power supply and a water supply to provide electricity and water for the brewing operation. The user can select a particular blend of coffee or other brewing ingredient and place the coffee in a brewing basket adapted to mount below the spray head of the present invention. A decanter is placed below the brew basket and seated on the warming ring to collect the coffee as it passes through the brew basket under the influence of gravity, collecting flavor solutes and oils from the coffee grounds located in the brew basket.

The brewing operation commences with the actuation of the power switch on the brewing apparatus, which prompts the user in the LED display to begin. The user can either press the brew or start button to begin the brewing operation, or depress the enter button to begin programming the brewing apparatus. If the brew button is depressed, the controller checks the status of the water in the heated tank to determine if the level and temperature are satisfactory. If the temperature is too low, the operation is suspended while the controller sends a signal to the heating tank to actuate the heating elements therein until such time as the water—as measured by the temperature probe—is determined to be above the pre-determined temperature as provided by the "cold temperature lock." Similarly, if the fluid level is too low, the controller sends a signal to the inlet valve coupled to the water supply to open and fill the heated tank to the appropriate level. When the level sensor determines that the heated tank is filled to the appropriate capacity, the brewing operation continues.

The controller then checks the global settings and brewing settings to determine if pre-infusion or pulse brewing is selected. If pre-infusion is selected, the controller momentarily opens the brew valve to allow heated water to flow from the heated tank through the brew valve to the spray head, where it is dispensed over the coffee grounds located in the brew basket. After the initial dispensing of heated water, the wetted grounds are allowed to soak while the brew valve is closed. After a predetermined period of time, the controller opens the brew valve and the brewing operation commences to completion without further interruption. However, if pulse brewing is selected, the user will select from a plurality of stored profiles (such as those shown in FIG. 4) using the arrow buttons on the control panel. The controller then systematically opens and closes the brew valve according to the sequence stored in the selected profile. The sequence is carried out by the controller while simultaneously monitoring the amount of coffee being brewed, either by use of a timer or a volume calculation. When the desired volume is reached, the controller shuts the brew valve regardless of when in the instant cycle the brewing apparatus resides.

If the user selects the programming option, by depressing the "enter" button after prompting by the display the user can use the left and right arrows to access various menus such as global settings, brewing options, model selection, recipe selection and editing, and exit. The user can access each menu and using the left arrow, right arrow, and enter buttons on the control panel program each menu and each setting. After programming is complete, by selecting "exit" the user can return to the primary set-up and initiate brewing operation.

The present invention as described above thus allows for both pulse brewing and pre-infusion, and further provides an easy way for users to implement pulse brewing using pre-stored profiles selected to provide optimum results for different conditions and different coffees. This feature can further be incorporated into a broader programming option that allows further control of the brewing operation in a single command, i.e., a recipe. Users are saved the trouble and complication of programming each step each time a selected coffee type or condition is used, and the expertise of others can be used to determine the appropriate brewing options.

The various embodiments described above are exemplary, and the present invention is not limited to the description of the embodiments above. One of ordinary skill in the art would be aware of many equivalents and modifications to the present invention, and such equivalents and modifications are considered within the scope of the present invention. Therefore, the entire scope and breadth of the present invention should be governed solely by the words of the claims appended hereto.

What is claimed is:

1. A brewing apparatus comprising:
   a reservoir for storing a heated infusion liquid;
   a brewing chamber having a drain disposed at a substantially lowermost elevational position;
   a spray head disposed over the brewing chamber for communicating infusion liquid from the reservoir into the brewing chamber;
   a flow control valve cooperating with the spray head to regulate flow of infusion liquid into the brewing chamber;
   a controller communicating with the flow control valve for opening the valve to permit infusion liquid to flow through the flow control valve into the brewing chamber, and for closing the valve to halt infusion liquid from flowing through the flow control valve into the brewing chamber;
   a memory accessible by the controller and storing a plurality of predetermined intermittent flow profiles each corresponding to a different sequence of opening and closing the flow control valve during a brewing operation, the sequences including
   (a) a first sequence wherein the valve is open for a selected interval and then the valve is closed for a selected interval, and such pattern repeats for a first period, and where the valve then opens continuously until a predetermined volume of infusion liquid is introduced into the brewing chamber;
   (b) a second sequence wherein the valve is open for at least one minute during a first period, and where the valve is then intermittently opened for a selected interval and closed for a selected interval during a second period until a predetermined volume of infusion liquid is introduced into the brewing chamber; and
   (c) a third sequence wherein the valve is adjustably opened and closed by a user created profile; and
   selectors operably controlled by a user for choosing one of said intermittent flow profiles stored in the memory accessible by the controller.

2. A method for brewing a beverage using a predetermined intermittent brewing sequence comprising:
   storing a plurality of intermittent flow profiles in a memory accessible by a controller, said stored intermittent flow profiles extending indefinitely without a predetermined finish;
   providing a selector to allow a user to choose from among the plurality of intermittent flow profiles in the memory;
   controlling the flow of infusing liquid introduced into a brewing chamber based upon a selected intermittent flow profile;
   directing flow of infusing liquid into said brewing chamber for a portion of said intermittent flow profile, and directing said infusing liquid directly into a collection reservoir when said infusing liquid is not directed to said brewing chamber to create an appearance of a continuous flow into said collection reservoir; and
   stopping the flow of infusing liquid into the brewing chamber during the intermittent flow profile when a predetermined volume of infusing liquid has been introduced into the brewing chamber.

3. The method of brewing a beverage of claim 2 further comprising:
   providing a heating tank for delivering infusing liquid into said brewing chamber; and
   monitoring a temperature of said heating tank, and actuating a heating element when said temperature falls below a preselected temperature.

4. The method of brewing a beverage of claim 2 further comprising:
   providing a recipe storing memory to save specific instructions that override global settings or portions of the selected intermittent flow profile.

5. The method of brewing a beverage of claim 4 wherein said recipe storing memory includes instructions for a brewing temperature based on a type of coffee brewed.

* * * * *